(12) United States Patent
Min et al.

(10) Patent No.: US 10,789,942 B2
(45) Date of Patent: Sep. 29, 2020

(54) WORD EMBEDDING SYSTEM

(71) Applicant: NEC Laboratories America, Inc., Princeton, NJ (US)

(72) Inventors: Renqiang Min, Princeton, NJ (US); Dinghan Shen, Durham, NC (US)

(73) Assignee: NEC Corporation (JP)

( * ) Notice: Subject to any disclaimer, the term of this patent is extended or adjusted under 35 U.S.C. 154(b) by 168 days.

(21) Appl. No.: 16/163,988

(22) Filed: Oct. 18, 2018

(65) Prior Publication Data

US 2019/0122655 A1    Apr. 25, 2019

Related U.S. Application Data

(60) Provisional application No. 62/576,296, filed on Oct. 24, 2017.

(51) Int. Cl.

| | |
|---|---|
| *G10L 15/16* | (2006.01) |
| *G10L 15/18* | (2013.01) |
| *G06N 3/04* | (2006.01) |
| *G10L 15/06* | (2013.01) |
| *G10L 15/22* | (2006.01) |
| *G06N 3/08* | (2006.01) |
| *G06F 40/30* | (2020.01) |

(52) U.S. Cl.
CPC ............. *G10L 15/18* (2013.01); *G06F 40/30* (2020.01); *G06N 3/04* (2013.01); *G06N 3/084* (2013.01); *G10L 15/063* (2013.01); *G10L 15/16* (2013.01); *G10L 15/22* (2013.01)

(58) Field of Classification Search
CPC ...................................................... G10L 15/16
USPC ................. 704/233, 235, 232, 9, 500, 234
See application file for complete search history.

(56) References Cited

U.S. PATENT DOCUMENTS

| | | | |
|---|---|---|---|
| 9,378,733 B1 * | 6/2016 | Vanhoucke | ............. G10L 15/02 |
| 9,576,214 B1 * | 2/2017 | Zhang | .................. G06K 9/6267 |
| 10,185,891 B1 * | 1/2019 | Martin | .................. G06K 9/6218 |
| 2016/0307071 A1 * | 10/2016 | Perronnin | ................ G06K 9/66 |
| 2017/0102921 A1 * | 4/2017 | Henry | .................... G06N 3/063 |
| 2017/0161633 A1 * | 6/2017 | Clinchant | ............ G06N 3/0454 |
| 2018/0012411 A1 * | 1/2018 | Richey | .................. G06T 19/006 |
| 2019/0065343 A1 * | 2/2019 | Li | ......................... G06F 11/079 |
| 2019/0065589 A1 * | 2/2019 | Wen | ...................... G06F 16/951 |
| 2019/0197366 A1 * | 6/2019 | Kecskemethy | ...... G06K 9/6269 |

(Continued)

OTHER PUBLICATIONS

Kim et al., "Convolutional Neural Networks for Sentence Classification", Proceedings of the 2014 Conference on Empirical Methods in Natural Language Processing (EMNLP), Oct. 2014; pp. 1746-1751.

(Continued)

*Primary Examiner* — Michael Colucci
(74) *Attorney, Agent, or Firm* — Joseph Kolodka (57) ABSTRACT

A computer-implemented method, computer program product, and computer processing system are provided for word embedding. The method includes receiving, by a processor device, a word embedding matrix. The method further includes generating, by a processor device, an average pooling vector and a max pooling vector, based on the word embedding matrix. The method also includes generating, by the processor device, a prediction by applying a Multi-Layer Perceptron (MLP) to the average pooling vector and the max pooling vector.

20 Claims, 5 Drawing Sheets

(56) References Cited

U.S. PATENT DOCUMENTS

2019/0214122 A1* 7/2019 Lee .................... G06F 16/3344

OTHER PUBLICATIONS

Iyyer et al., "Deep Unordered Composition Rivals Syntactic Methods for Text Classification", Proceedings of the 53rd Annual Meeting of the Association for Computational Linguistics and the 7th International Joint Conference on Natural Language Processing, Jul. 2015, pp. 1681-1691.

* cited by examiner

WORD EMBEDDING SYSTEM

This application claims priority to U.S. Provisional Patent Application No. 62/576,296 filed on Oct. 24, 2017, incorporated herein by reference herein its entirety.

BACKGROUND

Technical Field

The present invention relates to language processing and more particularly to a word embedding system for natural language processing.

Description of the Related Art

Word embedding is the collective name for a set of language modeling and feature learning techniques in Natural Language Processing (NLP), where words or phrases from a vocabulary are mapped to vectors of real numbers. Word and phrase embeddings, when used as the underlying input representation, have been shown to boost the performance in NLP tasks such as syntactic parsing and sentiment analysis.

Word embeddings, learned from massive unstructured text data, are widely-adopted building blocks for NLP, such as document classification, (short) sentence classification, natural language sequence matching, and so forth. By representing each word as a fixed-length vector, semantically similar words can be grouped and abundant linguistic regularities and patterns can be explicitly encoded. In the same spirit of learning distributed representations for natural language, many NLP applications also benefit from encoding word sequences (e.g., a sentence or a document) into a fixed-length feature vector. However, prior techniques for word embedding for NLP are overly complex and cumbersome to implement. Hence, there is a need for a simple word embedding system for NLP.

SUMMARY

According to an aspect of the present invention, a computer-implemented method is provided for word embedding. The method includes receiving, by a processor device, a word embedding matrix. The method further includes generating, by a processor device, an average pooling vector and a max pooling vector, based on the word embedding matrix. The method also includes generating, by the processor device, a prediction by applying a Multi-Layer Perceptron (MLP) to the average pooling vector and the max pooling vector.

According to another aspect of the present invention, a computer program product is provided for word embedding. The computer program product includes a non-transitory computer readable storage medium having program instructions embodied therewith. The program instructions are executable by a computer to cause the computer to perform a method. The method includes receiving, by a processor device, a word embedding matrix. The method further includes generating, by a processor device, an average pooling vector and a max pooling vector, based on the word embedding matrix. The method also includes generating, by the processor device, a prediction by applying a Multi-Layer Perceptron (MLP) to the average pooling vector and the max pooling vector.

According to yet another aspect of the present invention, a computer processing system is provided for word embedding. The computer processing system includes a memory for storing program code. The computer processing system further includes a processor device for running the program code to receive a word embedding matrix. The processor further runs the program code to generate an average pooling vector and a max pooling vector, based on the word embedding matrix. The processor also runs the program code to generate a prediction by applying a Multi-Layer Perceptron (MLP) to the average pooling vector and the max pooling vector.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to a word embedding method and system for Natural Language Processing (NLP). The word embedding system is simple compared to conventional approaches and is thus efficient and easy to implement.

For example, the word embedding method and system of the present invention involve no compositional parameters, and avoid the use of complex learning structures, instead using a Multi-Layer Perceptron (MLP) with various pooling functions in order to generate a prediction. In an embodiment, the lack of using compositional parameters enables exploitation of only word embedding information in order to generate a prediction. Moreover, the lack of computational parameters result in a prediction model having an order of magnitude fewer parameters (excluding embeddings) and are much more computationally efficient over conventional approaches.

In an embodiment, average pooling and max pooling functions are used, as the same have been determined to provide complimentary information for use by the MLP to generate a prediction.

Models formed in accordance with the teachings of the present invention are interchangeably referred to herein as "Simple Word Embedding Based model" or "SWEM" in short. Various variants of the preceding are described herein with respect to various embodiments of the present invention.

Figure 1:
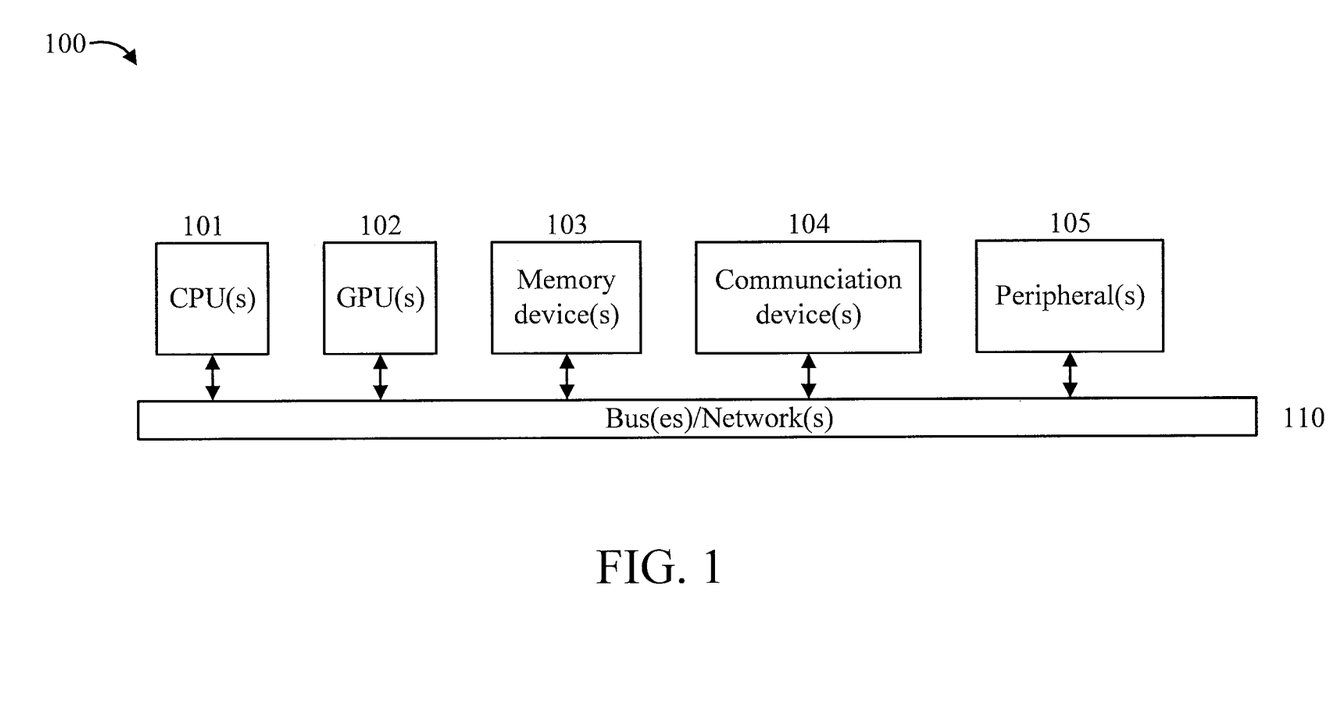
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A motivation of the present invention is to examine whether word embeddings themselves have already brought sufficient information for the corresponding prediction on a variety of NLP tasks. To emphasize the expressiveness of word embeddings, we compare several simple word embeddings-based models (SWEM), which have no compositional parameters, with existing recurrent/convolutional networks in a point-by-point manner. Moreover, we propose to leverage a max-pooling operation over the word embedding matrix, which is demonstrated to extract complementary features with the averaging operation. We consider three types of tasks with distinct properties: document classification, (short) sentence classification, and natural language sequence matching. Of course, the present invention is not limited to solely the three preceding types of tasks and, thus, can also be applied to other types of tasks, as readily appreciated by one of ordinary skill in the art given the teachings of the present invention provided herein, while maintaining the spirit of the present invention. To gain a better insight into the properties of word embeddings (SWEM architectures), we further explore the sensitivity of different compositional functions to the number of training data, by comparing SWEM with CNN/LSTM in cases where only part of the original training set samples are available.

To validate our experimental findings, we conduct additional experiments where the words in training set are all randomly shuffled. The motivation here is to understand how much word-order information is utilized to make the corresponding prediction on different tasks. Besides, we also investigate the dimension of word embeddings that are required for SWEM to be expressive enough (without sacrificing performances). Our findings regarding when (and why) word embeddings are enough for text sequence representations can be summarized as follows:

(1) Word embeddings are surprisingly effective at representing longer documents (with hundreds of words), while recurrent/convolutional compositional functions are necessary while constructing representations for short sentences;

(2) SWEM architecture performs stronger on topic categorization tasks than on sentiment analysis, which could be attributed to the different levels of sensitivity to word-order information for the two tasks;

(3) To match natural language sentences (e.g., textual entailment, answer sentence selection, etc.), word embeddings are already sufficiently informative for the corresponding prediction, while adopting complicated compositional functions like LSTM/CNN tends to be much less helpful;

(4) SWEM are much less likely to overfit than LSTM or CNN with a limited number of training data, exhibiting superior performance even with only hundreds of training samples; and (5) SWEM demonstrates competitive results with very small word embedding dimensions, suggesting that word embeddings are extremely efficient at encoding semantic information.

Figure 2:
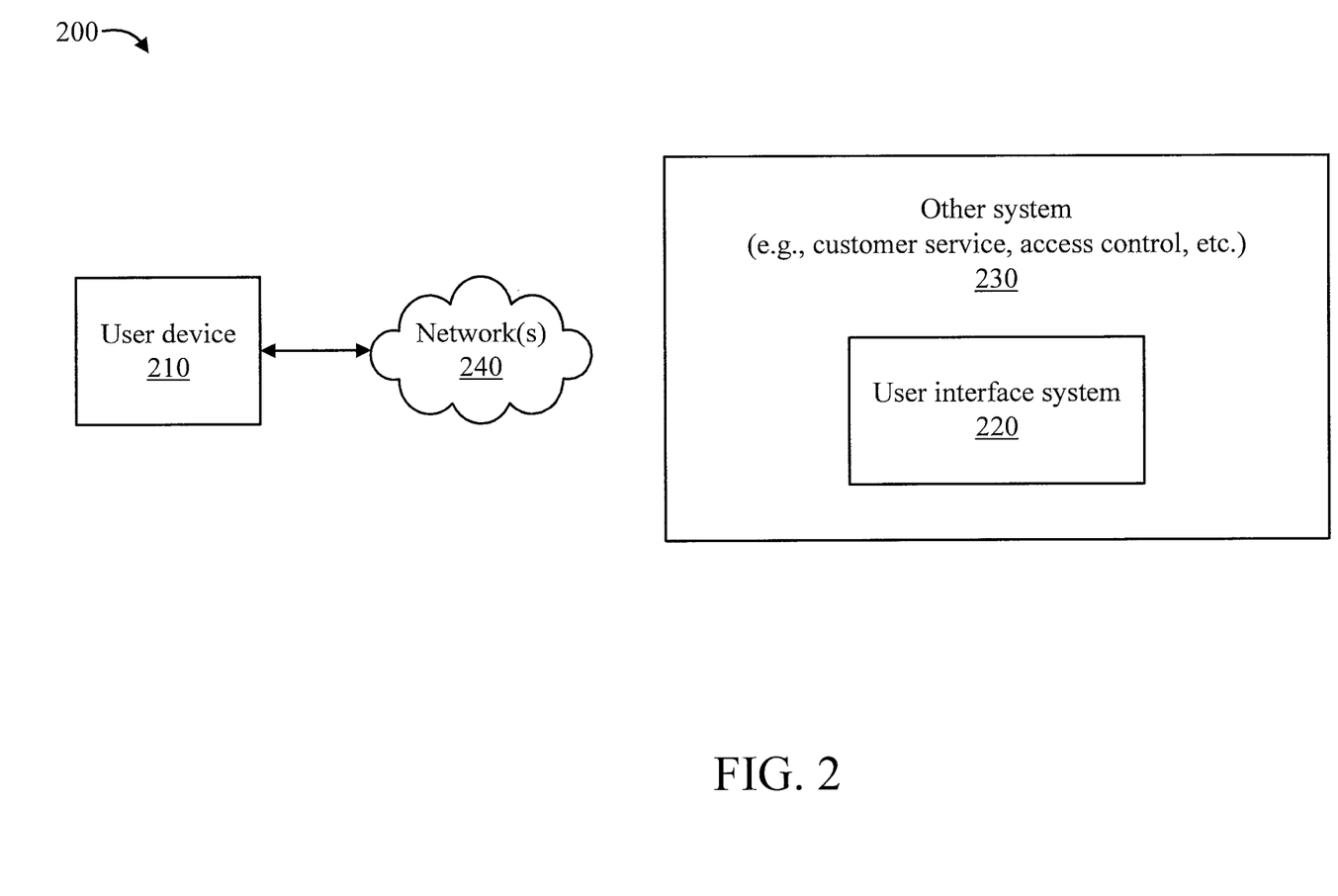
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a user device 210 and a user interface system 220. The user device 210 and the user interface system 220 can communicate via one or more networks 240.

The user device 210 can be any processor based device including, but not limited to, a smart phone, a tablet, a laptop, a desktop computer, and so forth. It is to be appreciated that the preceding devices are merely illustrative and that other devices can also be used. The user interface system 220 can be part of another system 230 such as a customer service system, an access control system, and so forth. It is to be appreciated that the preceding systems are merely illustrative and that other systems can also be used. These and other variations of elements of environment 200 are readily contemplated by one of ordinary skill in the art given the teachings of the present invention provided herein, while maintaining the spirit of the present invention.

Figure 3:
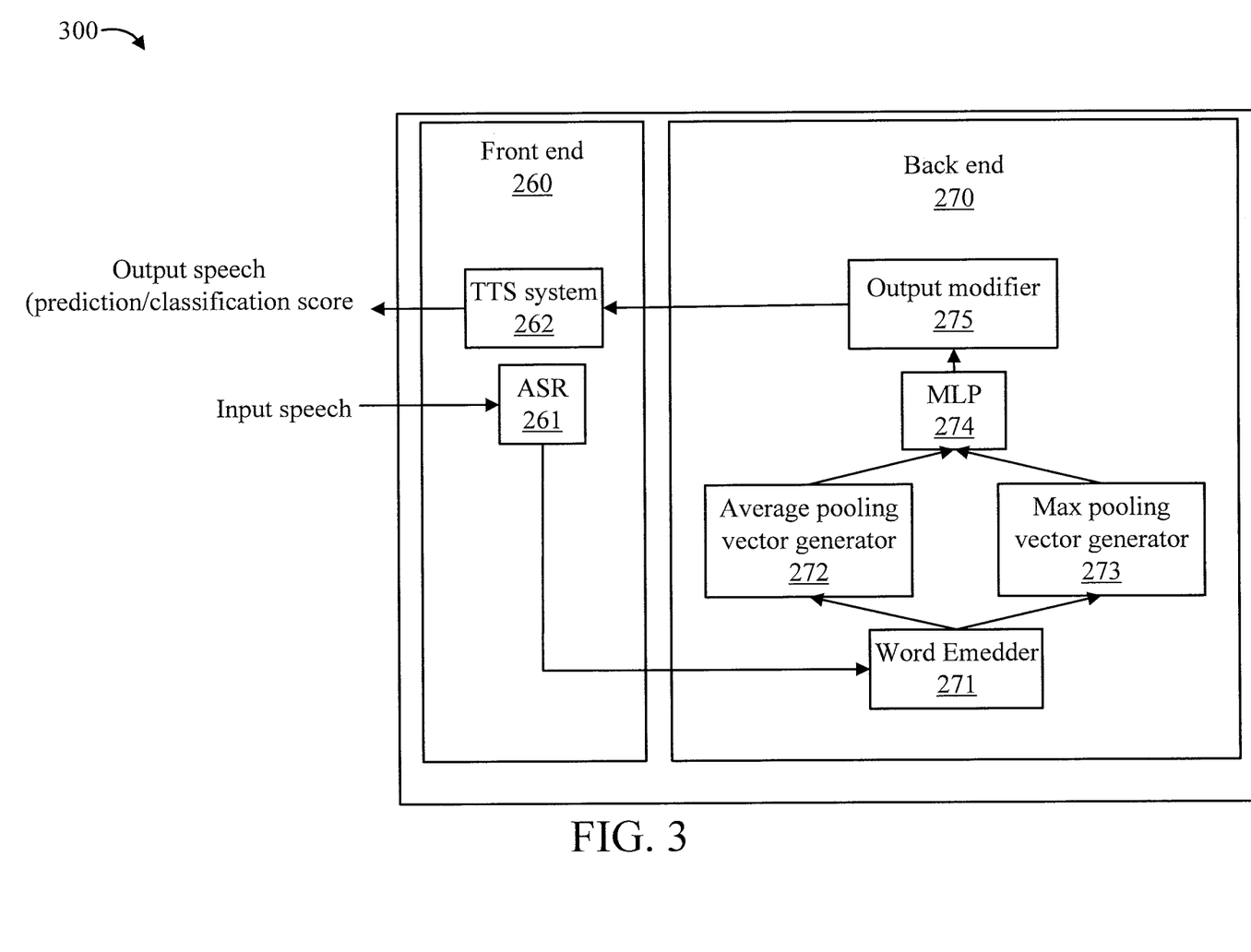
FIG. 3 is a block diagram further showing the user interface system of FIG. 2, in accordance with an embodiment of the present invention.

FIG. 3 is a block diagram further showing the user interface system 220 of FIG. 2, in accordance with an embodiment of the present invention.

The user interface system 220 includes a Natural Language Processing (NLP) system 250. The NLP system 250 includes a front end 260 and a back end 270. The front end 260 can include an Automatic Speech Recognition (ASR) 261 system for transforming acoustic utterances into representative text. The front end 260 can also include a Text-To-Speech (TTS) system 262 for transforming text into acoustic utterances.

The back end 270 can include a word embedder 271 for generating word embeddings from the representative text, an average pooling vector generator 272 for generating average pooling vectors, a max pooling vector generator 273 for generating max pooling vectors, a Multi-Layer Perceptron (MLP) 274 for generating predictions. In further detail, the average pooling vector generator 272 generates average pooling vectors that take the average value along each dimension of input word vectors, while the max pooling vector generator 273 generates max pooling vectors that take the maximum value along each dimension of input word vectors.

The back end 270 can further include an output modifier 275. The output modifier 275 can be in the form of a set of Rectified Linear Units (ReLUs) activation layers, a sigmoid function, or a softmax function. In an embodiment, the output modifier 275 is selectively chosen based on the task. A mapping or other structure can be used to map different tasks to different ones of the output modifier 275. In this way, the output accuracy is optimized.

In the case that the other system 230 is a customer service system, the NLP system 250 can generate a prediction about a customer's next action in order to aid a person or machine on "the other side" in responding to and dealing with the customer.

In the case that the other system 230 is an access control system, the NLP system 250 can generate a prediction relating to a person's authority, identity, etc. that is then acted upon by a response action (keep the lock locked, unlock the lock, open the secure door, close the secure door, etc.).

The preceding uses cases are merely exemplary, as the present invention can be readily applied to other use cases, as readily appreciated by one of ordinary skill in the art given the teachings of the present invention provided herein, while maintaining the spirit of the present invention.

Figure 4:
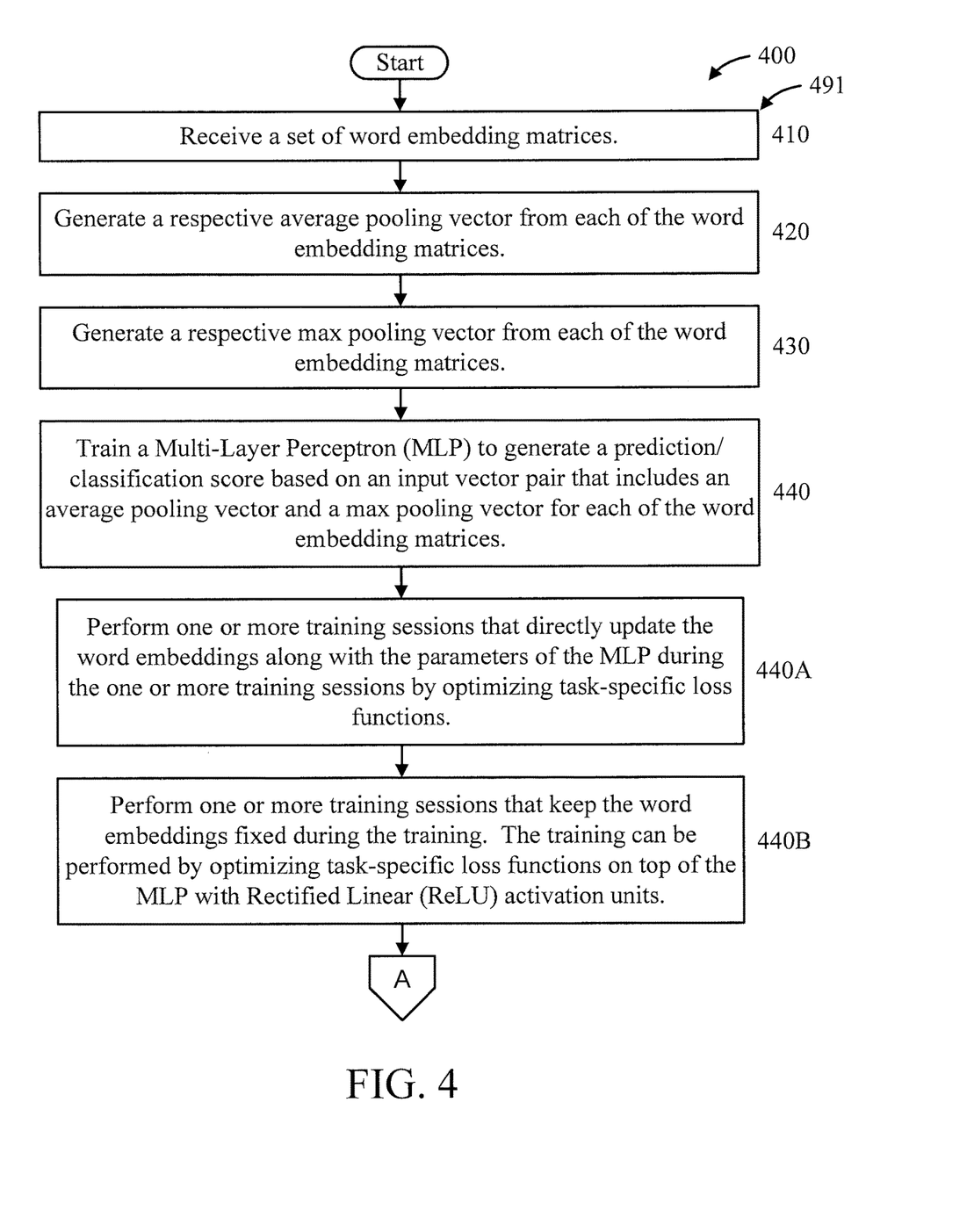
FIGS. 4-5 are flow diagrams showing an exemplary method for word embedding for Natural Language Processing (NLP) in a NLP system, in accordance with an embodiment of the present invention.
Figure 5:
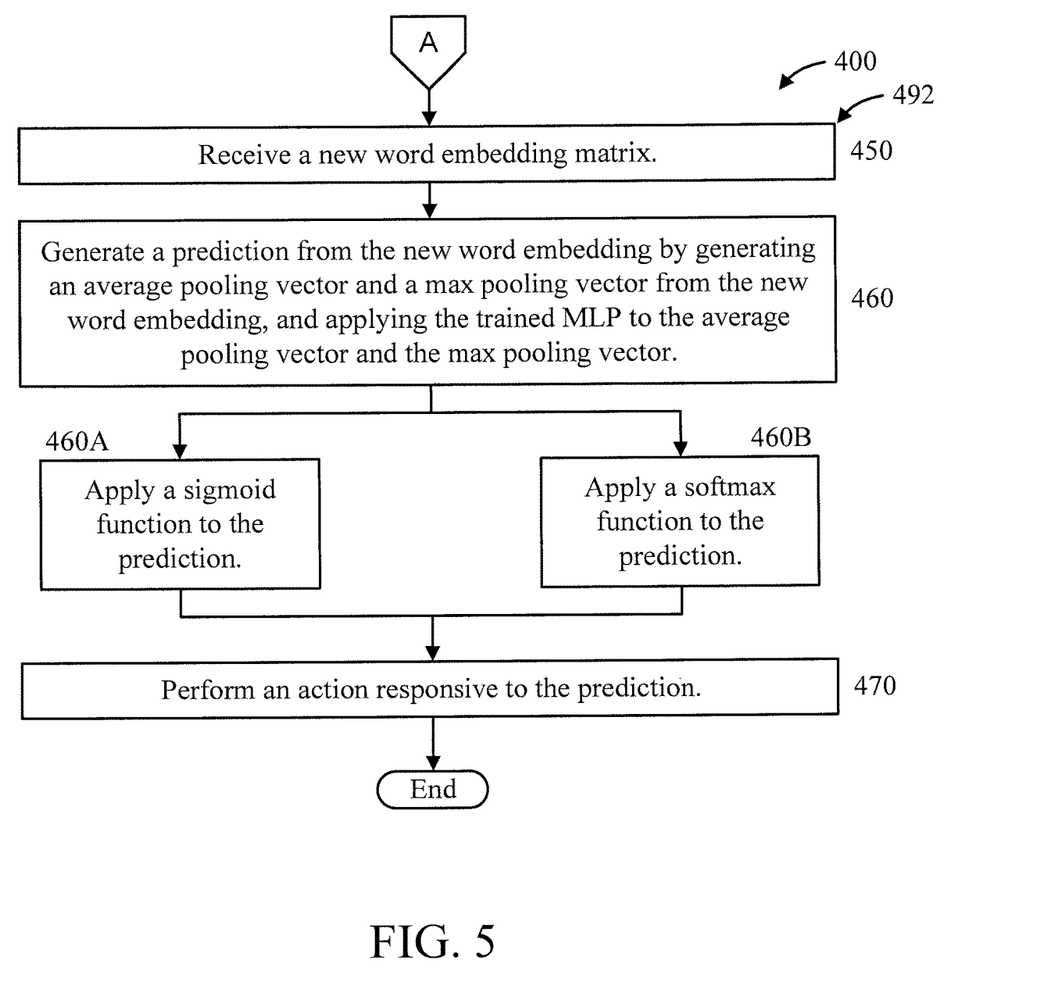

FIGS. 4-5 are flow diagrams showing an exemplary method 400 for word embedding for Natural Language Processing (NLP) in a NLP system, in accordance with an embodiment of the present invention. The method 400 includes a training stage 491 and an inference/prediction stage 492. The training stage 491 involves blocks 410 through block 440, and the inference/prediction stage 492 involves blocks 450-470.

It is to be appreciated that the present invention operates on (processes) input embedding matrices. The input embedding matrices can be for a sentence, a paragraph, or a document, which is simply a concatenation of word embeddings, with the number of columns equal to the length of the sentence, paragraph, or document. For the sake of illustration, word embeddings and sentence embeddings are described in various illustrative embodiments of the present invention described hereinafter.

At block 410, receive a set of word embedding matrices. A word embedding matrix is the concatenation of the vector representation of each word in an input sentence. For e.g., if an input sentence contains 100 words and each word has a 50-dimensional distributed embedding representation, the word embedding matrix will be a 50 times 100 matrix with each column corresponding to each word. The word embeddings can be initialized with pre-trained Word2vec or GloVe embeddings.

At block 420, generate a respective average pooling vector from each of the word embedding matrices.

At block 430, generate a respective max pooling vector from each of the word embedding matrices. The max pooling operation used to generate the max pooling vector has been determined to result in the max pooling vector including complimentary information relative to the average pooling vector.

Thus, each word embedding matrix has a respective average pooling vector and a max pooling vector calculated therefor. Accordingly, each word embedding matrix is formed from a pair of a respective average pooling vector and a respective max pooling vector.

At block 440, train a Multi-Layer Perceptron (MLP) to generate a prediction/classification score based on an input vector pair that includes an average pooling vector and a max pooling vector for each of the word embedding matrices.

In an embodiment, block 440 can include one or more of blocks 440A and 440B.

At block 440A, perform one or more training sessions that directly update the word embeddings along with the parameters of the MLP during the one or more training sessions by optimizing task-specific loss functions. In an embodiment, the training is performed by optimizing task-specific loss functions on top of the MLP with Rectified Linear (ReLU) activation units. The ReLU activation can involve one or more ReLU activation layers on top of (subsequent to) the MLP. It is noted that typically only the input layers to the MLP are linear, with the subsequent hidden layers being non-linearly activated. This step is performed when there is sufficient labeled training data available.

At block 440B, perform one or more training sessions that keep the word embeddings fixed during the training. In an embodiment, the training is performed by optimizing task-specific loss functions on top of the MLP with Rectified Linear (ReLU) activation units. The ReLU activation can involve one or more ReLU activation layers on top of (subsequent to) the MLP. It is noted that typically only the input layers to the MLP are linear, with the subsequent hidden layers being non-linearly activated.

At block 450, corresponding to the commencement of the prediction stage, receive a new word embedding matrix. This can involve transforming an acoustic utterance uttered by a user into representative text that is then processed for word embedding.

At block 460, generate a prediction from the new word embedding by generating an average pooling vector and a max pooling vector from the new word embedding, and applying the trained MLP to the average pooling vector and the max pooling vector.

In an embodiment, block 460 can include one of blocks 460A or 460B.

At block 460A, apply a sigmoid function to the prediction. The sigmoid function is applied to the prediction for binary (two-class) prediction.

At block 460B, apply a softmax function to the prediction. The softmax function is applied to the prediction to obtain multi-class prediction.

At block 470, perform an action responsive to the prediction. For example, in a customer service use scenario, the action can be to connect a person to a person able to help their issue, to issue a refund, exchange an item, credit an account, etc. In the case of an access control system, the action can be to lock a door/object or keep the door/object locked to restrict access, unlock a door/object to permit access, and so forth. It is to be appreciated that the preceding actions are merely illustrative.

A description will now be given regarding models and training, in accordance with one or more embodiments of the present invention. The description will include descriptions regarding notations used herein, a Simple Word-Embedding based Model (SWEM), a recurrent sequence encoder, and a convolutional sequence encoder, in accordance with one or more embodiments of the present invention.

A description will now be given regarding notations used herein.

In an embodiment, the present invention is applied to a text sequence X (either a sentence or document), composed of a sequence of words: $\{w_1, w_2, \ldots, w_L\}$, where L is the number of tokens, i.e., sentence/document length. Let $\{v_1, v_2, \ldots, v_L\}$ denote the word embedding for each token, where $v_i$ (for i=1, 2, 3 ..., L) is a h-dimensional vector. The compositional function aims to combine the word embeddings into a fixed-length sentence/document representation z.

A description will now be given regarding a SWEM, in accordance with an embodiment of the present invention.

To investigate the modeling capacity of word embeddings, we consider a type of models with no additional compositional parameters to encode natural language sequences, termed as SWEM (simple word embedding-based models). Among them, the simplest strategy is to compute the element-wise average over word vectors of all sequence tokens as follows:

$$z = \frac{1}{n}\sum_{i=1}^{L} v_i \quad (1)$$

Basically, this model averages over each of the h dimensions for all words, resulting in a representation z with the same dimension as the word embeddings (termed as SWEM-aver). Intuitively, z takes the information of every sequence element into account by the addition operation. Another facile strategy for computing sentence embeddings is to extract the most salient features from every word embedding dimension, by taking the maximum value along each dimension of the word vectors, similar to the max-over-time pooling operation in convolutional neural networks as follows:

$$z = \text{max-pooling}(v_1, v_2, \ldots, v_L) \quad (2)$$

We denote this model variant as SWEM-max. Considering that the two strategies above, namely averaging and max-pooling, are complementary in the sense that they account for different types of information from text sequences, we propose a third SWEM variant, where the two abstracted features are concatenated together to form the sentence embeddings (denoted as SWEM-concat). It is worth noting that for all SWEM variants, there are no additional compositional parameters to be learned. As a result, the models can only exploit the word embedding information for predictions.

A description will now be given regarding a recurrent sequence encoder.

One type of compositional function widely adopted is defined in a recurrent manner: the model successively take word $w_t$ at step t, along with hidden unit $h_{t-1}$ from the last time step, to update the hidden state via $h_t = f(w_t, h_{t-1})$, where f is the transition function. To address the issue of learning long-term dependencies, f is typically defined as Long Short-Term Memory (LSTM), which employs gates to control the information abstracted from a sequence as follows:

$$\begin{bmatrix} i_t \\ f_t \\ o_t \\ \tilde{c}_t \end{bmatrix} = \begin{bmatrix} \sigma \\ \sigma \\ \sigma \\ \tanh \end{bmatrix} W \cdot \begin{bmatrix} h_{t-1} \\ w_t \end{bmatrix} \quad (3)$$

$$c_t = f_t \odot c_{t-1} + i_t \odot \tilde{c}_t \quad (4)$$

$$h_t = o_t \odot c_t \quad (5)$$

where $\odot$ stands for element-wise multiplication. Intuitively, the LSTM encodes a text sequence considering its word-order information, but yields additional compositional parameters W to be learned.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for word embedding, comprising:
   receiving, by a processor device, a word embedding matrix;
   generating, by a processor device, an average pooling vector and a max pooling vector, based on the word embedding matrix; and
   generating, by the processor device, a prediction by applying a Multi-Layer Perceptron (MLP) to the average pooling vector and the max pooling vector.

2. The computer-implemented method of claim 1, wherein the word embedding matrix is generated from the pre-trained word embedding for a vocabulary, and wherein the method further comprises initializing out-of-vocabulary words from a uniform distribution within a preset range.

3. The computer-implemented method of claim 1, further comprising performing a training session for the MLP, wherein the word embeddings are directly updated during the training session.

4. The computer-implemented method of claim 1, further comprising performing a training session for the MLP, wherein the word embeddings are kept fixed during the training session.

5. The computer-implemented method of claim 1, further comprising concatenating the average pooling vector and the max pooling vector in preparation for use by the MLP to generate the prediction.

6. The computer-implemented method of claim 5, further comprising forming sentence embeddings from a concatenation of the average pooling vector and the max pooling vector.

7. The computer-implemented method of claim 1, wherein the word embedding matrix is generated from a sentence.

8. The computer-implemented method of claim 1, wherein the word embedding matrix is generated from a document.

9. The computer-implemented method of claim 1, further comprising concatenating feature embeddings of phrases containing multiple words.

10. The computer-implemented method of claim 9, wherein a max pooling operation is employed on the feature maps.

11. The computer-implemented method of claim 1, further comprising transforming, by an automatic speech recognition system, an acoustic utterance by a user into the word embedding matrix.

12. A computer program product for word embedding, the computer program product comprising a non-transitory computer readable storage medium having program instructions embodied therewith, the program instructions executable by a computer to cause the computer to perform a method comprising:
   receiving, by a processor device, a word embedding matrix;
   generating, by a processor device, an average pooling vector and a max pooling vector, based on the word embedding matrix; and
   generating, by the processor device, a prediction by applying a Multi-Layer Perceptron (MLP) to the average pooling vector and the max pooling vector.

13. The computer program product of claim 12, wherein the word embedding matrix is generated based on a vocabulary, and wherein the method further comprises initializing out-of-vocabulary words from a uniform distribution within a preset range.

14. The computer program product of claim 12, wherein the method further comprises performing a training session for the MLP, wherein the word embeddings are directly updated during the training session.

15. The computer program product of claim 12, wherein the method further comprises performing a training session for the MLP, wherein the word embeddings are kept fixed during the training session for certain tasks.

16. The computer program product of claim 12, further comprising concatenating the average pooling vector and the max pooling vector in preparation for use by the MLP to generate the prediction.

17. The computer program product of claim 16, further comprising forming sentence embeddings from a concatenation of the average pooling vector and the max pooling vector.

18. The computer program product of claim 12, further comprising concatenating embeddings of phrases containing multiple words.

19. The computer program product of claim 18, wherein a max pooling operation is employed on the feature maps.

20. A computer processing system for word embedding, comprising:
   a memory for storing program code; and
   a processor device for running the program code to
      receive a word embedding matrix;
      generate an average pooling vector and a max pooling vector, based on the word embedding matrix; and
      generate a prediction by applying a Multi-Layer Perceptron (MLP) to the average pooling vector and the max pooling vector.

* * * * *